(12) United States Patent
Soh et al.

(10) Patent No.: US 7,835,446 B2
(45) Date of Patent: *Nov. 16, 2010

(54) METHOD OF SELECTING A REFERENCE PICTURE

(75) Inventors: Yoon Seong Soh, Seoul (KR); Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 2 days.

This patent is subject to a terminal disclaimer.

(21) Appl. No.: 12/285,061

(22) Filed: Sep. 29, 2008

(65) Prior Publication Data

US 2009/0128689 A1     May 21, 2009

Related U.S. Application Data

(63) Continuation of application No. 10/541,540, filed as application No. PCT/KR2004/000445 on Mar. 3, 2004.

(30) Foreign Application Priority Data

Mar. 3, 2003     (KR)     ...................... 10-2003-0013198

(51) Int. Cl.
*H04B 1/66*     (2006.01)
*H04N 7/12*     (2006.01)

(52) U.S. Cl. ................................. 375/240.24

(58) Field of Classification Search ............ 375/240.12, 375/240.26, 240.25, 240.24, 240, 240.29, 375/240.13; 348/413.1, 415.1; 382/232; *H04N 7/12*; *H04B 1/66*

See application file for complete search history.

(56) References Cited

U.S. PATENT DOCUMENTS 5,561,465 A    10/1996   Fautier et al.
6,072,548 A    6/2000    Schoner
6,453,115 B1 *  9/2002   Boyle ......................... 386/68
6,480,543 B1 * 11/2002   Pau et al. ............... 375/240.16
6,584,152 B2 *  6/2003   Sporer et al. ........... 375/240.01
6,625,320 B1 *  9/2003   Nilsson et al. ............. 382/238

(Continued)

FOREIGN PATENT DOCUMENTS

| CA | 2473898      | 6/2004  |
| EP | 1 414 245    | 4/2004  |
| EP | 1 569 459    | 8/2005  |
| JP | 2004-194297  | 7/2004  |
| WO | WO 03/047271 | 5/2003  |

OTHER PUBLICATIONS

UK Office Action dated Oct. 20, 2005.

(Continued)

*Primary Examiner*—Tung Vo
(74) *Attorney, Agent, or Firm*—Harness, Dickey & Pierce, P.L.C.

(57) ABSTRACT

In one embodiment, the method includes determining reference picture index numbers in a reference picture list. The reference picture index numbers increase for reference pictures having a decreasing display order with respect to a picture including the macroblock. The reference picture index numbers increase for reference pictures having an increasing display order with respect to the picture including the macroblock, and the reference picture index numbers of the reference pictures having a decreasing display order are less than the reference picture index numbers of the reference pictures having an increasing display order. The embodiment further includes reordering the reference picture index number allocated to each reference picture in the reference picture list, obtaining a field reference picture index associated with the current field macroblock, determining a frame reference picture index based on the field reference picture index and the reference picture index numbers, and selecting a field reference picture having a parity different from a parity of the field macroblock if the field reference picture index is an odd value.

1 Claim, 12 Drawing Sheets

U.S. PATENT DOCUMENTS

| | | | |
|---|---|---|---|
| 6,658,056 B1* | 12/2003 | Duruoz et al. | 375/240 |
| 6,917,652 B2* | 7/2005 | Lyu | 375/240.25 |
| 6,968,003 B1 | 11/2005 | Gonzales et al. | |
| 6,980,596 B2 | 12/2005 | Wang et al. | |
| 7,003,035 B2 | 2/2006 | Tourapis et al. | |
| 7,010,046 B2 | 3/2006 | Trevers et al. | |
| 7,310,373 B2* | 12/2007 | Kondo et al. | 375/240.16 |
| 7,333,545 B2* | 2/2008 | Duruoz et al. | 375/240.25 |
| 2001/0024472 A1* | 9/2001 | Sporer et al. | 375/240.16 |
| 2001/0043796 A1* | 11/2001 | Ishikawa | 386/69 |
| 2003/0099292 A1 | 5/2003 | Wang et al. | |
| 2003/0099294 A1* | 5/2003 | Wang et al. | 375/240.15 |
| 2003/0133506 A1 | 7/2003 | Haneda | |
| 2004/0076236 A1* | 4/2004 | Duruoz et al. | 375/240.25 |
| 2004/0086044 A1* | 5/2004 | Kondo et al. | 375/240.13 |
| 2004/0146109 A1* | 7/2004 | Kondo et al. | 375/240.16 |
| 2004/0151248 A1* | 8/2004 | Kondo et al. | 375/240.16 |
| 2004/0264570 A1* | 12/2004 | Kondo et al. | 375/240.16 |
| 2005/0041742 A1 | 2/2005 | Abe et al. | |
| 2005/0152454 A1* | 7/2005 | Wang et al. | 375/240.16 |
| 2006/0008010 A1 | 1/2006 | Soh et al. | |
| 2006/0109913 A1 | 5/2006 | Wang et al. | |
| 2006/0239358 A1 | 10/2006 | Soh et al. | |
| 2008/0037653 A1* | 2/2008 | Soh et al. | 375/240.24 |
| 2008/0037654 A1* | 2/2008 | Soh et al. | 375/240.24 |
| 2008/0037655 A1* | 2/2008 | Soh et al. | 375/240.24 |
| 2008/0063075 A1* | 3/2008 | Kondo et al. | 375/240.16 |
| 2009/0110064 A1 | 4/2009 | Soh et al. | |
| 2009/0110080 A1 | 4/2009 | Soh et al. | |
| 2009/0116553 A1 | 5/2009 | Soh et al. | |
| 2009/0116559 A1 | 5/2009 | Soh et al. | |
| 2009/0116560 A1 | 5/2009 | Soh et al. | |
| 2009/0122871 A1 | 5/2009 | Soh et al. | |
| 2009/0128689 A1 | 5/2009 | Soh et al. | |
| 2009/0129462 A1 | 5/2009 | Soh et al. | |
| 2009/0129463 A1 | 5/2009 | Soh et al. | |
| 2009/0129475 A1 | 5/2009 | Soh et al. | |
| 2009/0129480 A1 | 5/2009 | Soh et al. | |
| 2009/0129482 A1 | 5/2009 | Soh et al. | |
| 2009/0135900 A1 | 5/2009 | Soh et al. | |

OTHER PUBLICATIONS

ITU- Telecommunications Standardization Sector, Study Group 16, Question 6, Video Coding Experts Group (VCEG), 14$^{th}$ Meeting: Santa Barbara, CA, USA, Sep. 24-27, 2001, pp. 1-10.

UK Office Action dated Jun. 22, 2006.

JVT-B118r*, Joint Video Team (JVT) of ISO/IEC MPEG and ITU-T VCEG, Jan. 29-Feb. 1, 2002, pp. 35 and 36.

EP Search Report dated Dec. 9, 2008.

Wang: "MB adaptive field/frame coding for interlace sequences" Joint Video Team JVT of ISO?IEC MPEG and ITU-T VCEG, No. JVT-D108, Jul. 26, 2002, pp. 1-12.

Wiegand: "Editor's latest draft of JVT WD2 design" Joint Video Team JVT of ISO-IEC MPEG and ITU-T VCEG, No. JVT-C039, May 10, 2002, pp. 1-112.

Chad Fogg Pixonics et al: "Adaptive Filed/Frame Block Coding Experiment Proposal", ITU-T, SG 16 Q6, Video Coding Experts Group VCEG, No. VCEG-N76, Sep. 24, 2001, pp. 1-7.

Wiegand: "Multi-picture handling" Joint Video Team JVT of ISO-IEC MPEG and ITU-T VCEG, No. JVT-D018, Jul. 26, 2002, pp. 1-7.

Wiegand: "Multi-picure handling", Joint Video Team JVT of ISO-IEC MPEG and ITU-T VCEG, No. JVT-D018, 726/2002, powerpoint presentation, pp. 1-6.

European Patent Office Search report dated Apr. 29, 2009 for counterpart European application.

JVT: Study of Final Committee Draft of Joint Video Specification (ITU-T Rec. H.264, ISO/IEC 14496-10 AVC), Joint Video Team (JVT) of ISO/IEC MPEG & ITU-T VCEG (ISO/IEC JTC1/SC29/WG11 and ITU-T SG16 Q6), No. JVT-F100, Feb. 16, 2003, pp. I-XV, 1-226, XP030005665.

Nilsson: "Reference picture buffering text changes" Joint Video Team (JVT) of ISO/IEC MPEG & ITU-T VCEG (ISO/IEC JTC1/SC29/WG11 and ITU-T SG16 Q6), No. JVT-E149r5, Oct. 18, 2002, pp. I-XX, 1-207, EX030005566.

Japanese Office Action dated Sep. 30, 2009.

Japanese Office Action dated Oct. 2, 2009.

Thomas Wiegand. "Study of Final Committee Draft of Joint Video Specification". p. i, 75-81, 104-105. Dec. 2002.

Rajeev Gandhi et al. "Macroblock Adaptive Frame/Field Coding for Interlace Sequences". p. 1-6. Jul. 22-26, 2002.

L. Wang et al. "Interlace Coding Tools for H.26L Video Coding". p. 1-11. Dec. 4-6, 2001.

Office Action for corresponding U.S. Appl. No. 12/232,955 dated Feb. 16, 2010.

Office Action for corresponding U.S. Appl. No. 12/285,050 dated Feb. 25, 2010.

Office Action for corresponding U.S. Appl. No. 12/285,293 dated Feb. 24, 2010.

Office Action for corresponding U.S. Appl. No. 12/285,051 dated Mar. 11, 2010.

Office Action for corresponding U.S. Appl. No. 12/232,954 dated Feb. 25, 2010.

Office Action for corresponding U.S. Appl. No. 12/285,151 dated Feb. 25, 2010.

Office Action for corresponding U.S. Appl. No. 12/285,053 dated Mar. 11, 2010.

Office Action for corresponding U.S. Appl. No. 12/232,957 dated Feb. 16, 2010.

Office Action for corresponding U.S. Appl. No. 12/285,052 dated Mar. 11, 2010.

"Core Experiment on Interlaced Video Coding." ITU—Telecommunications Standardization Sector, Study Group 16 Question 6; Document VCEG-N85, Oct. 29, 2001.

Recommendation ITU-T H.262 (1995 E); ISO/IEC 13818-2: 1995.

UK Office Action dated Oct. 10, 2006.

Canadian Office Action dated Jun. 12, 2006.

Working Draft No. 2. Revision 8 (WD-2 rev 8) Joint Video Team (JVT) of ISO/IEC MPEG) and ITU-T VCEG, Geneva; Jan. 29-Feb. 1, 2002; pp. 1-38.

Korean Office Action dated Sep. 30, 2005.

"Selective Fast Motion Estimation with Variable Motion Block Sizes", Proc. Intern. Workshop on Advanced Image Technology, pp. 101-106, Jan. 2003. See the whole document.

ITU—Telecommunications Standarization Sector, Study Group 16 Question 6, Video Coding Experts Group (VCEG), 14$^{th}$ Meeting: Santa Barbara, CA, USA, Sep. 24-27, 2001. See the whole document.

ITU-T Recommendation H.262 and ISO/IEC 13818-2, Generic Coding of Moving Pictures and Associated Audio Information: Video, 1995. See the whole document.

* cited by examiner

Fig. 1
(Related Art)

| 0 | 2 | 4 | 6 |
|---|---|---|---|
| 1 | 3 | 5 | 7 |
| 8 | 10 | 12 | 14 |
| 9 | 11 | 13 | 15 |

Fig. 10
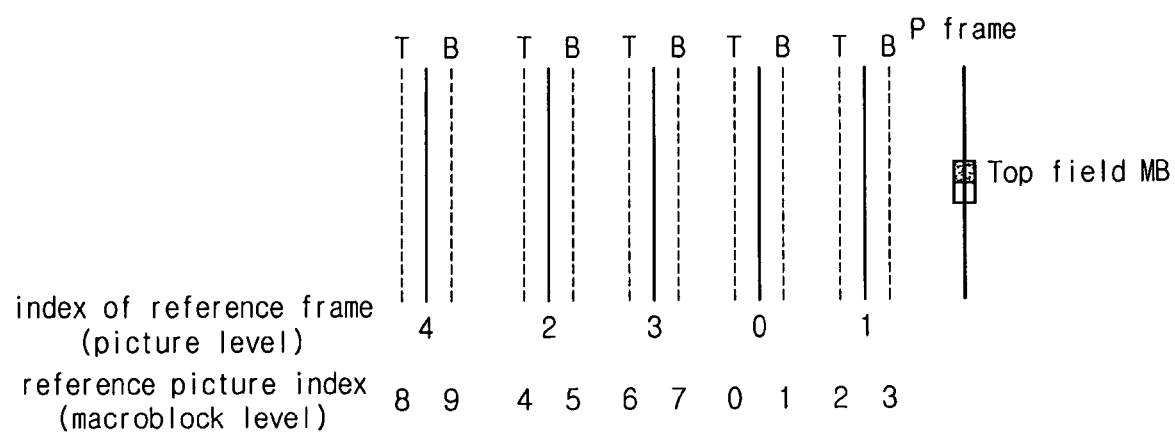
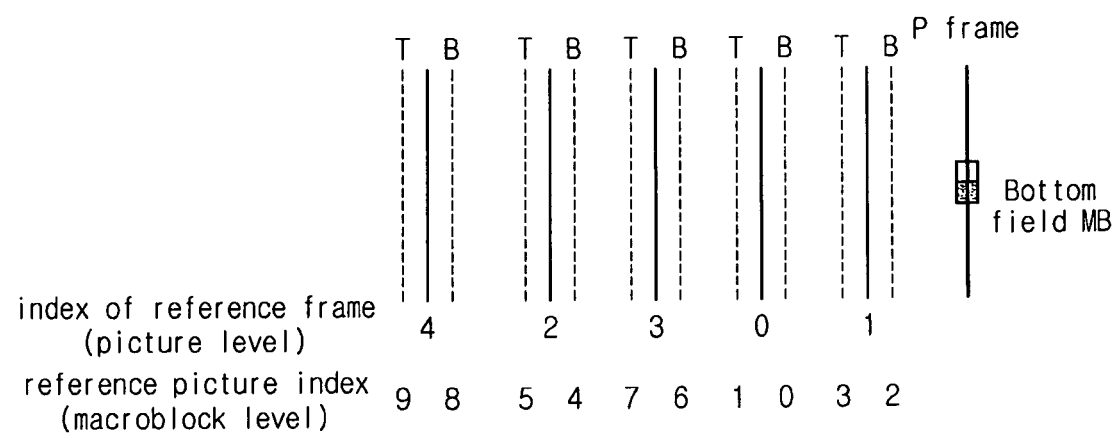

METHOD OF SELECTING A REFERENCE PICTURE

METHOD OF SELECTING A REFERENCE PICTURE

This is a continuation of, and claims priority under 35 U.S.C. §120 to, U.S. application Ser. No. 10/541,540, filed May 19, 2006, which is the U.S. National Stage of International Application No. PCT/KR/2004/000445, filed Mar. 3, 2004, the entire contents of all of which are hereby incorporated by reference in its entirety. This application also claims priority from Korean Patent Application No. 10-2003-0013198 filed on Mar. 3, 2003, in the Korean Intellectual Property Office under 35 U.S.C. §119. The entire contents of which are incorporated herein by reference.

TECHNICAL FIELD

The present invention relates to coding and encoding a moving picture.

BACKGROUND ART

Moving picture coding systems compensate for motion using motion vector information. In the case of moving picture coding system that uses multiple reference pictures, reference picture index information as well as motion vector information is required for motion compensation. The reference picture index is a value that is used to distinguish multiple reference pictures from each other. A coder transfers the reference picture index to a decoder. The decoder selects the reference picture as indicated by the reference picture index, and performs motion compensation using the selected reference picture.

Generally, scanning methods for images are classified into either progressive scanning or interlaced scanning. In the case of the progressive scanning, an image of one frame consists of data that are sampled at the same time. In case of the interlaced scanning, an image of one frame consists of data that are sampled at different times, and the samples are alternated line by line.

The interlaced image of a frame is usually divided into two fields called a top field and a bottom field. In the interlaced scanning, one frame is divided into two field images. In this specification, an image is treated based on a unit of a picture. A frame or a field may be referred to as a picture.

Three coding methods for an interlaced moving picture are proposed. A first coding method is a field picture coding method which performs a coding process, considering each field as an independent picture at a picture or slice level. A second coding method is the frame picture coding method which performs a coding process after combining two fields into one frame at a picture or slice level. A third coding method is a frame picture coding method with frame/field macroblock, which performs a coding process by combining two fields into one frame and selecting a frame mode or a field mode at a macroblock level.

In the third coding method, two vertically adjacent macroblocks are bound into a pair and the coding is performed in unit of a macroblock pair. In FIG. 1, numbers assigned in the macroblock pairs indicate macroblock addresses that are used to distinguish the macroblocks from each other.

Here, a frame macroblock is a macroblock which is coded at upper and lower macroblocks of the macroblock pair in units of a frame. In other words, each macroblock is coded in units of a frame after two fields are combined into one frame.

Meanwhile, a field macroblock is a macroblock that is coded at upper and lower macroblocks of macroblock pairs in units of a field. The macroblock pair is divided into top and bottom field components and each field is coded independently. At this time, the macroblock pairs are rearranged so that the upper and lower macroblocks may respectively contain only a top field component and only a bottom field component. The upper macroblock is called a top field macroblock and the lower macroblock is called a bottom field macroblock.

A reference buffer for storing multiple reference pictures is configured in units of a frame. In the frame picture coding, all reference pictures are considered as units of a frame in which two fields are combined into one frame, and one picture among the reference frame pictures is used for motion compensation. Accordingly, values are allocated to the reference picture indexes in units of a frame.

The reference picture index for a P frame is obtained by sorting all the reference frames in an order reverse to a coding order and then sequentially allocating an index, which is increased by one, to the sorted reference frames. The reference picture index for a B frame is classified into a list 0 and a list 1, and is determined based on a display order of the reference frame.

First, in case of the reference frame list 0, indexes are allocated in a reverse order to the reference frames whose display order lags behind the B frame, and then, the remaining indexes are allocated in the display order to the reference frames whose display order leads the B frame. In case of the reference frame list 1, in contrast to the reference frame list 0, indexes are allocated in the display order to the reference frames whose display order leads the B frame, and then, the remaining indexes are allocated in a reverse order to the reference frame whose display order lags behind the B frame.

FIG. 2 shows a reference picture index for a P frame when a size of the reference buffer is 5, and FIG. 3 shows the reference picture index lists 0 and 1 for a B frame.

In the field picture coding, the fields of all reference pictures are considered as independent pictures and one of the reference field pictures is used for motion compensation. Accordingly, values are allocated to the reference picture indexes in units of a field. At this time, the reference fields are combined in the unit of a frame, and then, the reference picture indexes in each field of the P frame are sorted in an order reverse to a coding order of the frame. Then, index values that are increased by one are alternately allocated in an order that starts from a reference field having parity equal to a current picture to a reference field having parity different from the current picture, while visiting the sorted reference frames in sequence.

In addition, in the case of the reference picture index lists 0 and 1 for each field of a B frame, all the reference fields are combined in units of a frame and then a reference frame is sorted in the same manner as the method of determining reference frame index of a B frame. Thereafter, the indexes that are increased by one are alternately allocated in an order that starts from a reference field having parity equal to a current picture to a reference field having parity different from the current picture, while visiting the sorted reference frames in sequence.

FIG. 4 shows reference picture indexes of top and bottom fields of a P frame when a size of a reference buffer is 5, and FIG. 5 shows reference picture index lists 0 and 1 of top and bottom fields of a B frame that can be used as a reference.

In order to improve coding efficiency, the moving picture coding system using multiple reference pictures provides a function of reordering the reference picture indexes before decoding a picture or a slice. The reference picture indexes are arbitrarily reordered so as to enhance the coding efficiency after determining an initial reference picture index for the frame and field pictures. FIG. 6 shows a result of determining an initial reference picture index for a P frame and arbitrarily reordering indexes according to the above-described method.

When the moving picture coding system using the multiple reference pictures codes an interlaced moving picture into a frame picture having frame/field macroblocks, all the reference pictures for the frame macroblock are considered as a frame unit and one of the reference frame pictures must be used for motion compensation. In addition, all the reference pictures for the field macroblock are considered as independent pictures and one of the reference field pictures must be used for motion compensation.

Accordingly, in the frame picture coding that selects the frame/field coding modes at the macroblock level, it is necessary to allocate values to the reference picture index in frame unit or field unit according to the coding mode of each macroblock.

SUMMARY OF THE INVENTION

An embodiment of the present invention provides reference picture information used for motion compensation by determining the reference picture index differently according a coding mode of macroblock when interlaced moving picture is coded with a frame picture having frame/field macroblocks in a moving picture coding system using multiple reference pictures.

In one embodiment, the method of selecting a reference picture for processing a field macroblock includes selecting at least one reference picture for processing a field macroblock from at least one reference picture list using reference picture index information. Here, each selected at least one reference picture is a field. For example, the reference field may a top field or a bottom field.

In another embodiment, the method may further include processing the field macroblock using the selected at least one reference picture.

In a further embodiment, the method may include forming the at least one reference picture list. For example, the forming step may include initializing the at least one reference picture list, and reordering the at least one reference picture list.

In another embodiment, if the reference picture index information is an even index number, then the selected at least one reference field has a same field parity as the field macroblock.

In yet another embodiment, if the reference picture index information is an odd index number, then the selected at least one reference field has a field parity different from the field macroblock.

In one embodiment, the method of selecting a reference picture for processing a field macroblock includes selecting at least one reference picture for processing a field macroblock from at least one reference picture list using reference picture index information. Here, each selected at least one reference picture is a field, and a parity of the selected at least one reference field may be based on the parity of the field macroblock and the reference picture index information.

In one embodiment, the method includes determining reference picture index numbers in a reference picture list. The reference picture index numbers increase for reference pictures having a decreasing display order with respect to a picture including the macroblock. The reference picture index numbers increase for reference pictures having an increasing display order with respect to the picture including the macroblock, and the reference picture index numbers of the reference pictures having a decreasing display order are less than the reference picture index numbers of the reference pictures having an increasing display order. The embodiment further includes reordering the reference picture index number allocated to each reference picture in the reference picture list, obtaining a field reference picture index associated with the current field macroblock, determining a frame reference picture index based on the field reference picture index and the reference picture index numbers, and selecting a field reference picture having a parity different from a parity of the field macroblock if the field reference picture index is an odd value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

Figure 1:
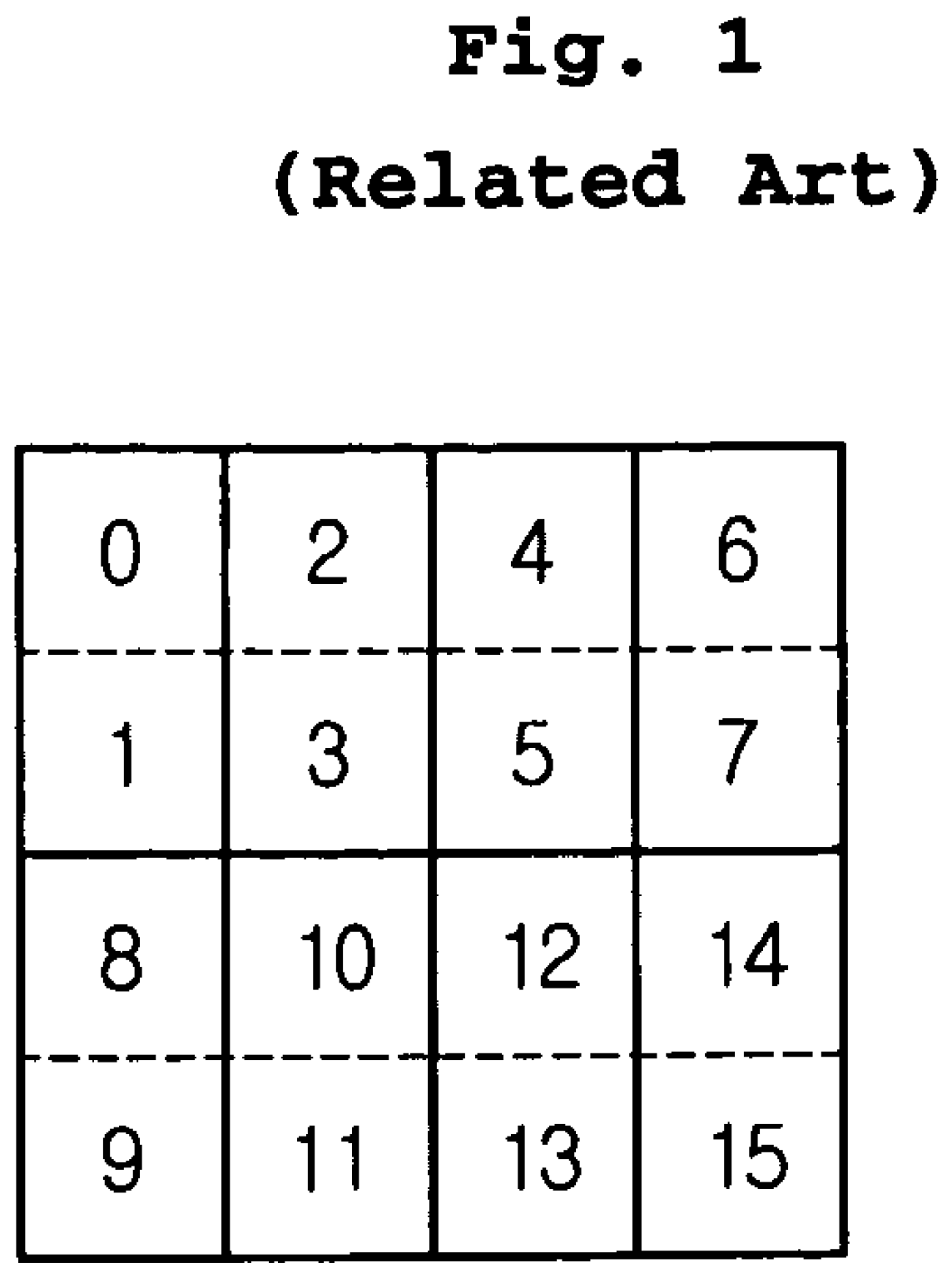

FIG. 1 shows macroblock pair in frame picture having general frame/field macroblock;

FIG. 10 shows reference picture indexes of a P frame having field macroblocks in a moving picture coding system according to another embodiment of the present invention (case 3);

DETAIL DESCRIPTION OF EXAMPLE EMBODIMENTS

Figure 2:
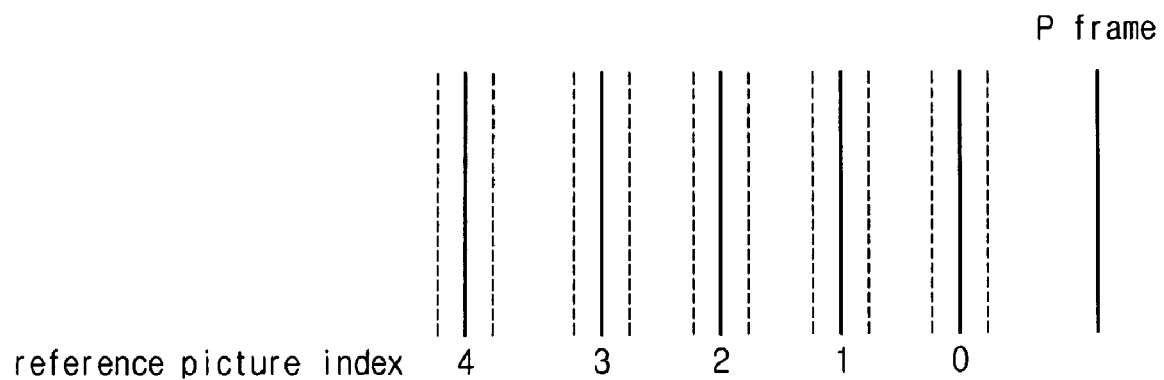
FIG. 2 shows reference picture indexes of P frame coding in a moving picture coding system according to the related art.
Figure 3:
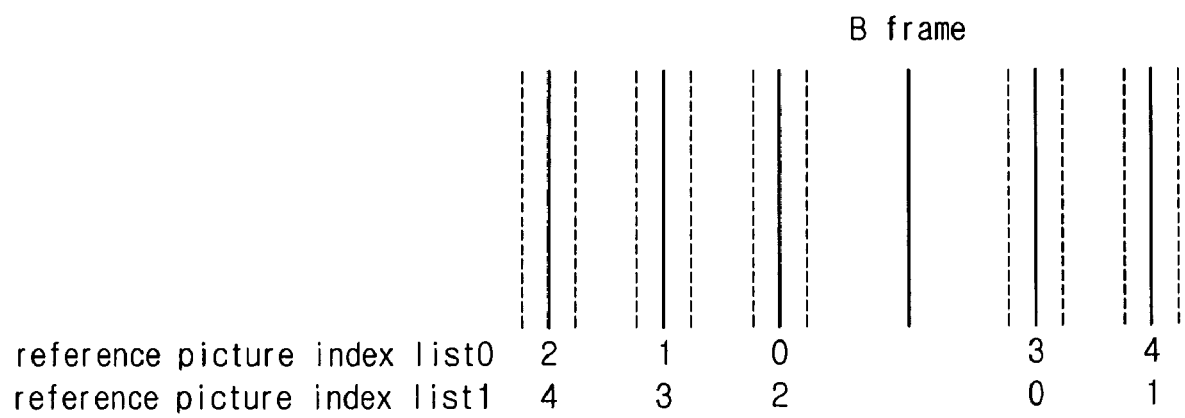
FIG. 3 shows the reference picture index lists 0 and 1 of B frame coding in a moving picture coding system according to the related art.
Figure 4:
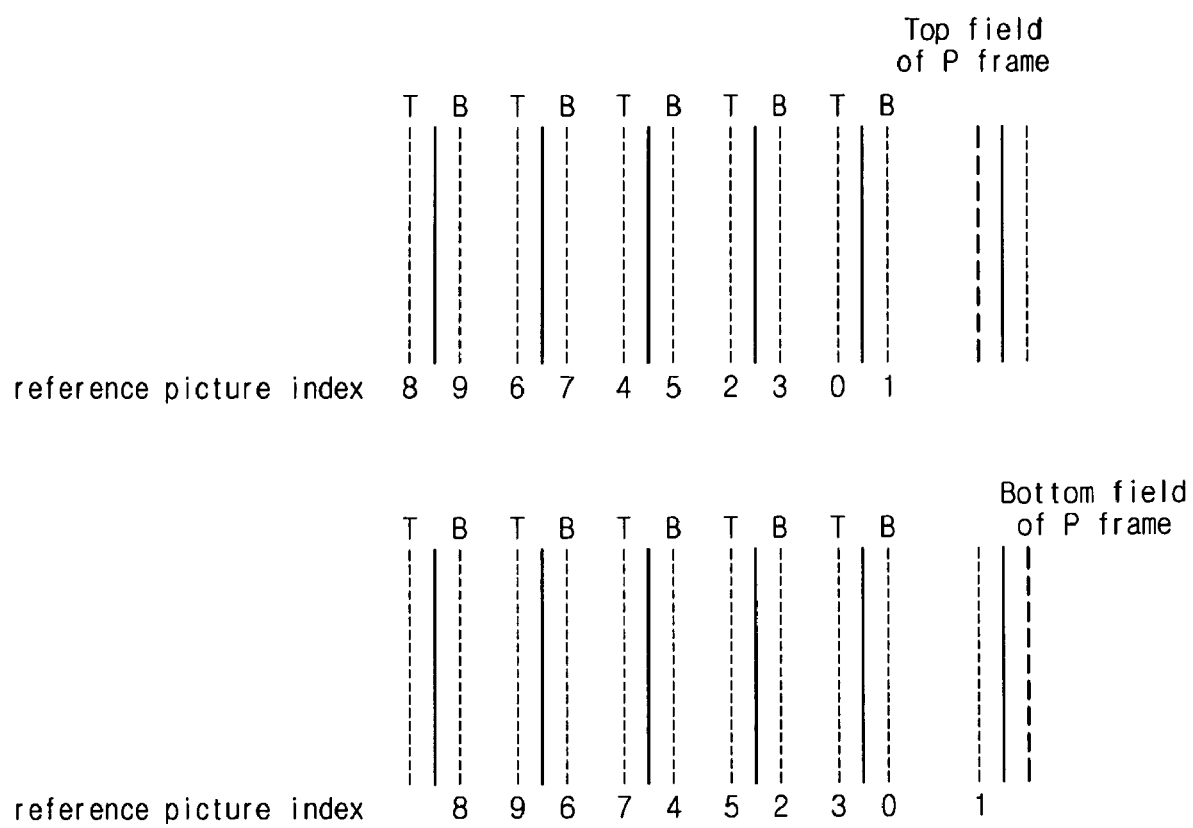
FIG. 4 shows reference picture indexes in a coding of top and bottom fields of a P frame in a moving picture coding system according to the related art.
Figure 5:
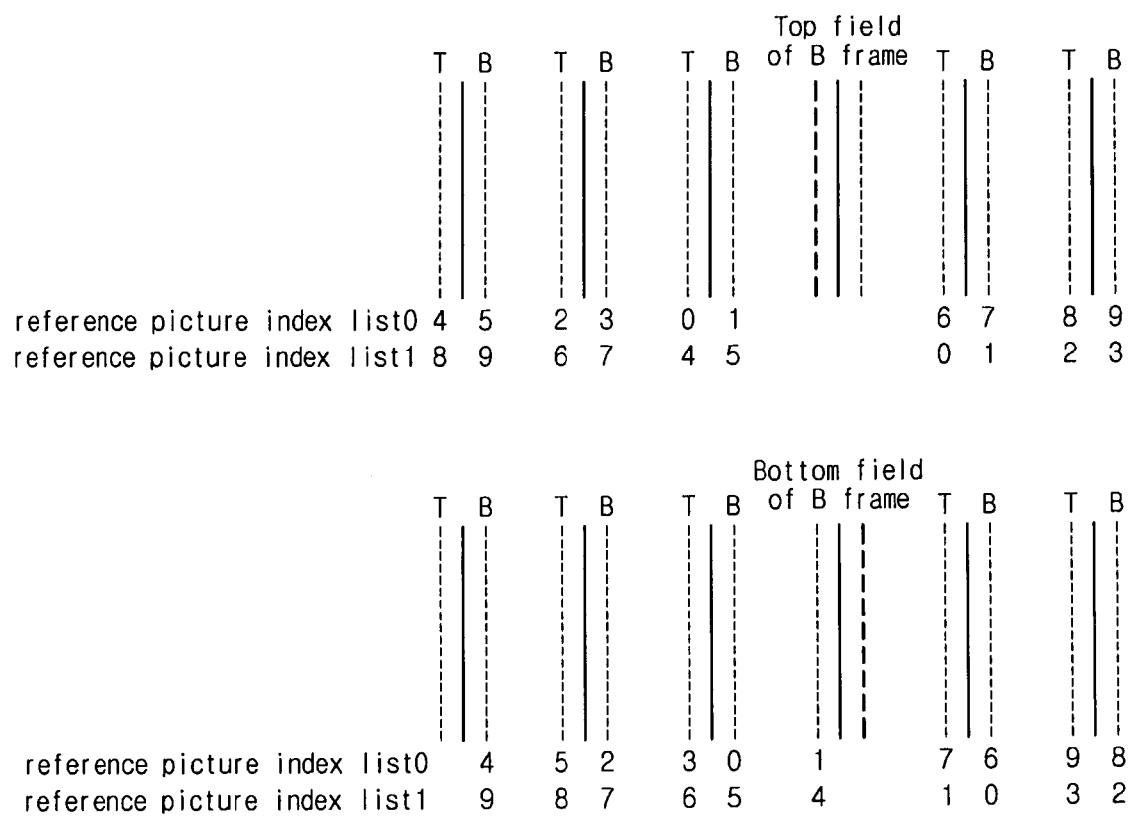
FIG. 5 shows reference picture index lists 0 and 1 in a coding of top and bottom fields of a B frame in a moving picture coding system according to the related art.
Figure 6:
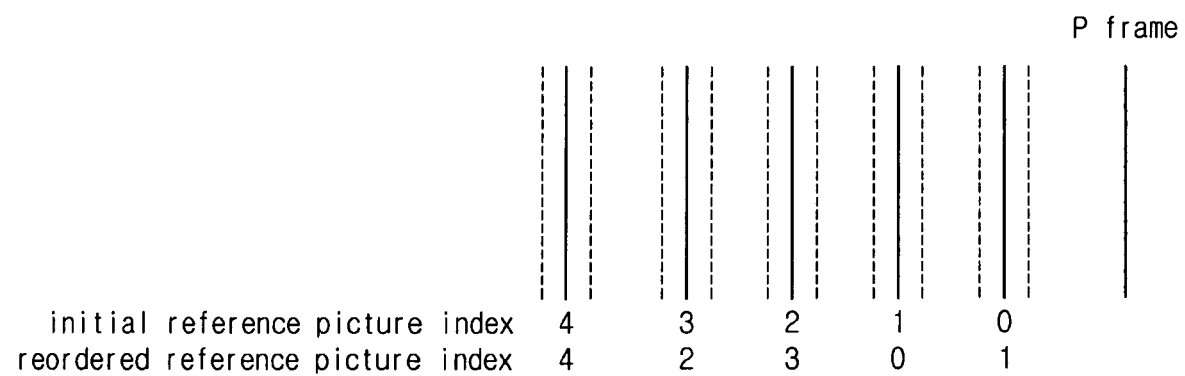
FIG. 6 shows reference picture indexes reordered in a coding of a P frame in a moving picture coding system according to the related art.

Hereinafter, example embodiments of the present invention will be described in detail with reference to accompanying drawings.

As stated previously, moving picture coding systems compensate for motion using motion vector information. In the case of a moving picture coding system that uses multiple reference pictures, reference picture index information as well as motion vector information is used for motion compensation. The reference picture index is a value that is used to distinguish multiple reference pictures from each other. A coder transfers the reference picture index to a decoder. The decoder selects the reference picture as indicated by the reference picture index, and performs motion compensation using the selected reference picture.

When an interlaced moving picture is coded into a frame picture having frame/field macroblocks, a moving picture coding system using multiple reference pictures performs a motion compensation from a reference frame in order for frame coding in the frame macroblock. In other words, the reference pictures may be considered as a frame unit. The moving picture coding system, however, performs a motion compensation from a reference field in order for a field coding in the field macroblocks. In other words, the reference pictures may be considered as a field unit.

Accordingly, the frame pictures having frame/field macroblock use indexes having different structures at the macroblock level. For example, the frame macroblock uses a reference picture index of a frame unit and the field macroblock uses a reference picture index of a field unit. It should be considered that the reference picture indexes may be reordered at a picture or slice level.

Therefore, the frame picture having frame/field macroblocks should consider the reference picture in a frame unit at a picture or slice level and have the reordered reference picture indexes of a frame unit. The reference picture index may be determined according to a coding mode of macroblock based on the reference picture indexes of the frame unit at the macroblock level.

The present invention provides an embodiment of a method for determining reference picture indexes in a frame picture having frame/field macroblocks. The method includes a process of determining reference picture indexes at a picture (or slice) level and a process of determining reference picture indexes at a macroblock level.

[1] Determination (or Initialization) of Reference Picture Indexes at a Picture (or Slice) Level The reference pictures may be considered in a frame unit at a picture or slice level and reference picture indexes of frame unit are calculated.

In the method of determining a reference picture index for a P frame, reference frames are sorted in an order reverse to a coding order and indexes are allocated while visiting the sorted reference frames in sequence.

Reference picture indexes for a B frame are determined based on a display order of the reference frames. First, in case of a reference frame list 0, indexes are allocated in a reverse order to reference frames whose display orders lag behind the B frame and the remaining indexes are allocated in the display order to reference frames whose display order lead the B frame.

In case of a reference frame list 1, in contrast to the reference frame list 0, indexes are allocated in the display order to reference frames whose display orders are higher than the B frame and the remaining indexes are allocated in a reverse order to reference frames whose display orders are lower than the B frame.

In this and the other embodiment described below, in order to improve coding efficiency, the moving picture coding system using multiple reference pictures may provide a function of reordering the reference picture indexes before decoding a picture or a slice. The reference picture indexes are arbitrarily reordered so as to enhance the coding efficiency after determining an initial reference picture index for the frame and field pictures. When the reference picture indexes are reordered so as to enhance a coding efficiency, the reference picture indexes of a frame unit may be reordered.

[2] Determination (or reordering) of Reference Picture Index at Macroblock Level The reference picture index is modified according to the coding mode of the macroblock while performing a coding in unit of a macroblock pair with respect to the reference picture indexes of a frame unit, which are obtained at the picture (or slice) level. This process will be described below.

[2.1] Case of Frame Macroblock

Since motion compensation may be performed to frame macroblocks from a reference frame, the reference picture index may be a frame unit. Accordingly, the reference picture indexes of a frame unit, which are obtained at the picture (or slice) level, are used.

Figure 7:
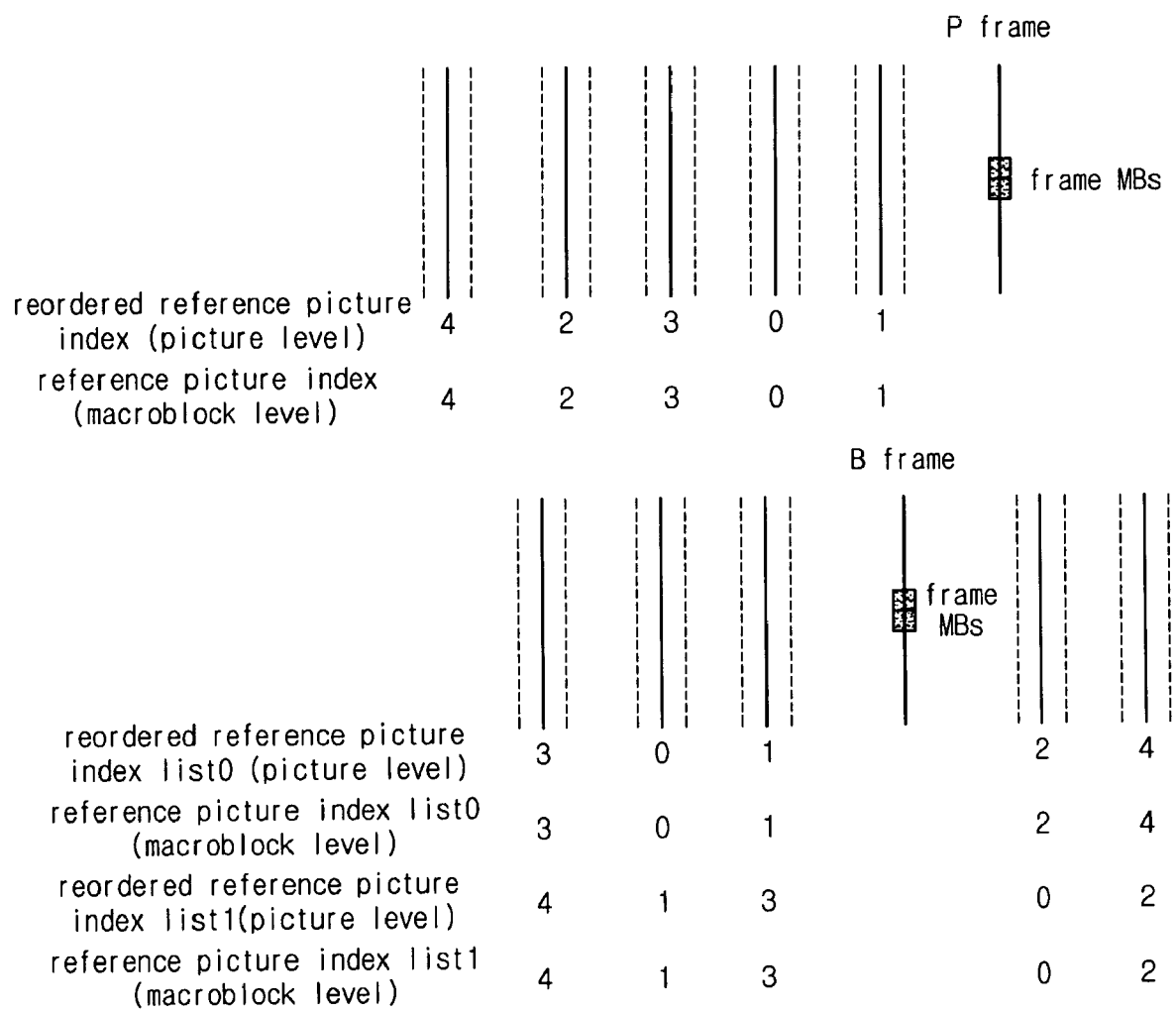
FIG. 7 shows reference picture indexes of a P frame and a B frame having frame macroblocks in a moving picture coding system according to the present invention.

A reference frame stored in a reference buffer may be configured with a field pair having parities (e.g., top and bottom) opposite to each other. FIG. 7 shows reference picture indexes for a frame macroblock in a P frame and a B frame when a size of the reference buffer is 5.

[2.2] Case of Field Macroblock

Since motion compensation may be performed to field macroblocks from a reference field, the reference picture index may be a field unit. In this case, a field pair having parities opposite to each other is also present in the reference buffer. Accordingly, each reference frame is divided into two fields while sequentially visiting the reference frame according to the reference picture indexes of a frame unit, which are obtained at the picture (or slice) level. Then, the reference picture indexes are newly allocated to each field. The reference picture indexes for two fields of each reference frame are allocated in various methods (Cases 1 to 4).

(Case 1)

Regardless of the top and bottom field macroblocks of a current field macroblock, a lower index is allocated to the top reference field and a higher index is allocated to the bottom reference field while sequentially visiting the reference frames in an order of the reference picture indexes, which are obtained at the picture (or slice) level.

In other words, the top and bottom reference field indexes may be given by the equation below.

Top reference field index=2×picture index of reference frame

Bottom reference field index=2×picture index of reference frame+1

Figure 8:
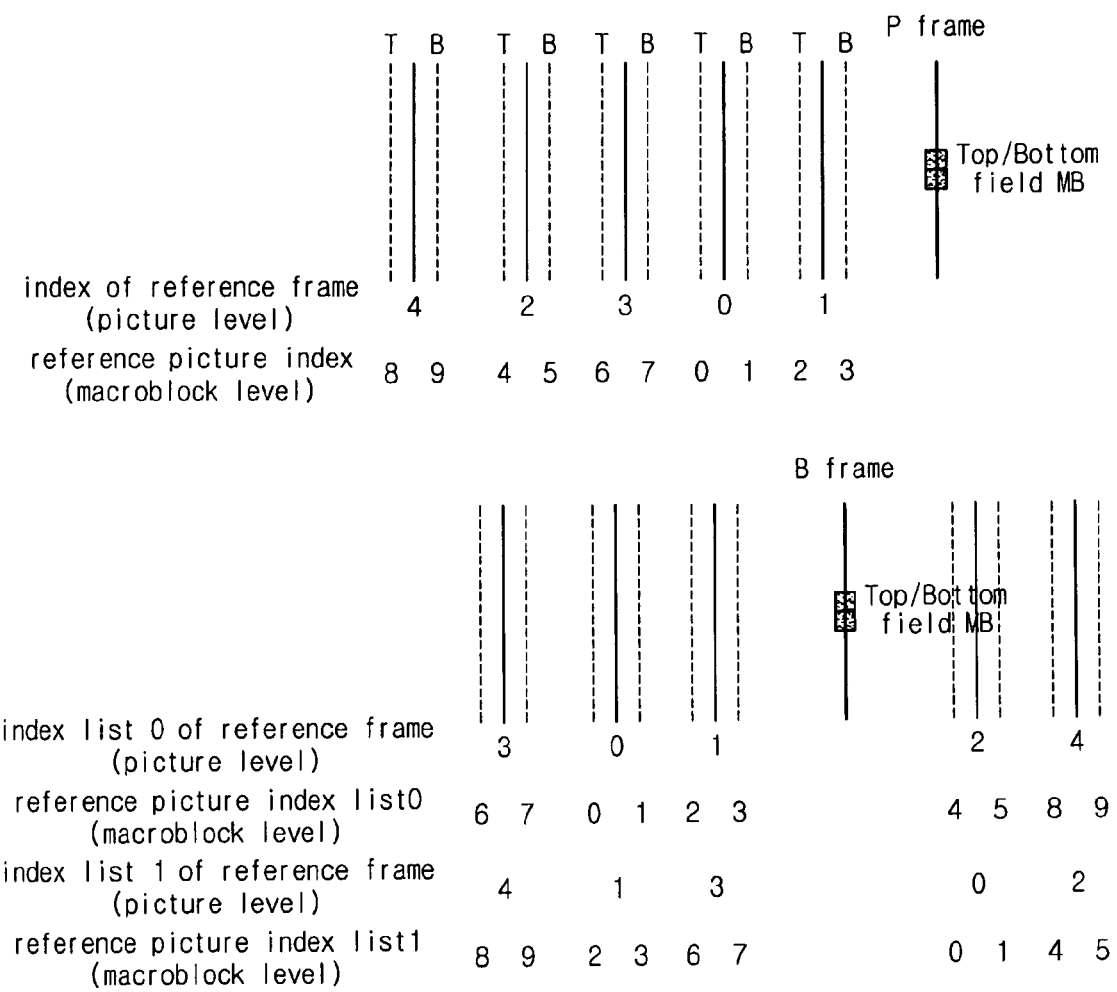
FIG. 8 shows reference picture indexes of P frame and B frame having field macroblock in a moving picture coding system according to an embodiment of the present invention (case 1)

FIG. 8 shows reference picture indexes for field macroblocks of a P frame and a B frame.

(Case 2)

Regardless of the top and bottom field macroblocks of a current field macroblock, a lower index is allocated to the bottom reference field and a higher index is allocated to the top reference field while sequentially visiting the reference frames in an order of the reference picture indexes, which are obtained at the picture (or slice) level.

In other words, the top and bottom reference field indexes may be given by an equation below.

Top reference field index=2×picture index of reference frame+1

Bottom reference field index=2×picture index of reference frame

Figure 9:
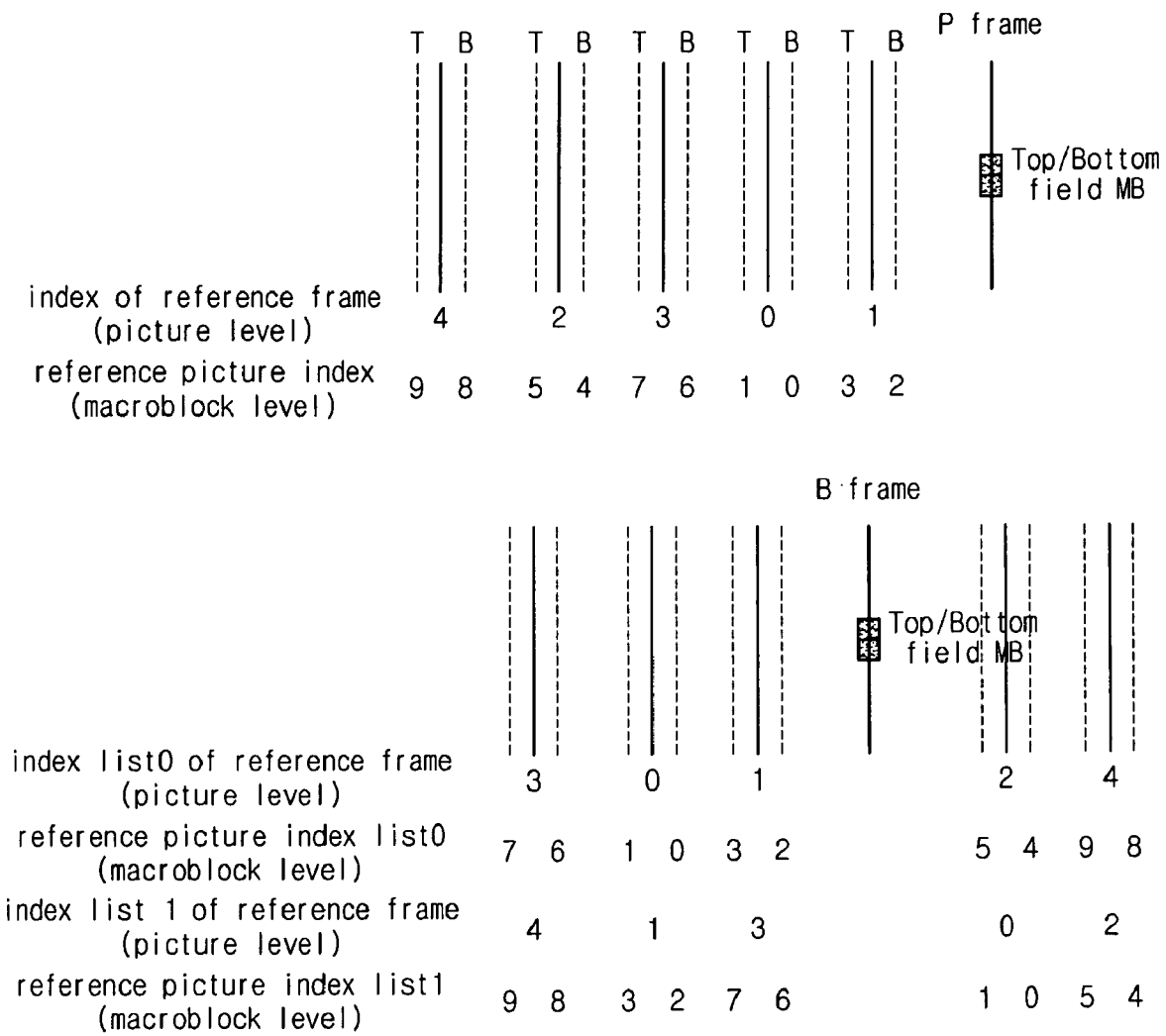
FIG. 9 shows reference picture indexes of a P frame and a B frame having field macroblocks in a moving picture coding system according to another embodiment of the present invention (case 2)

FIG. 9 shows reference picture indexes for field macroblocks of a P frame and a B frame.

(Case 3)

Figure 11:
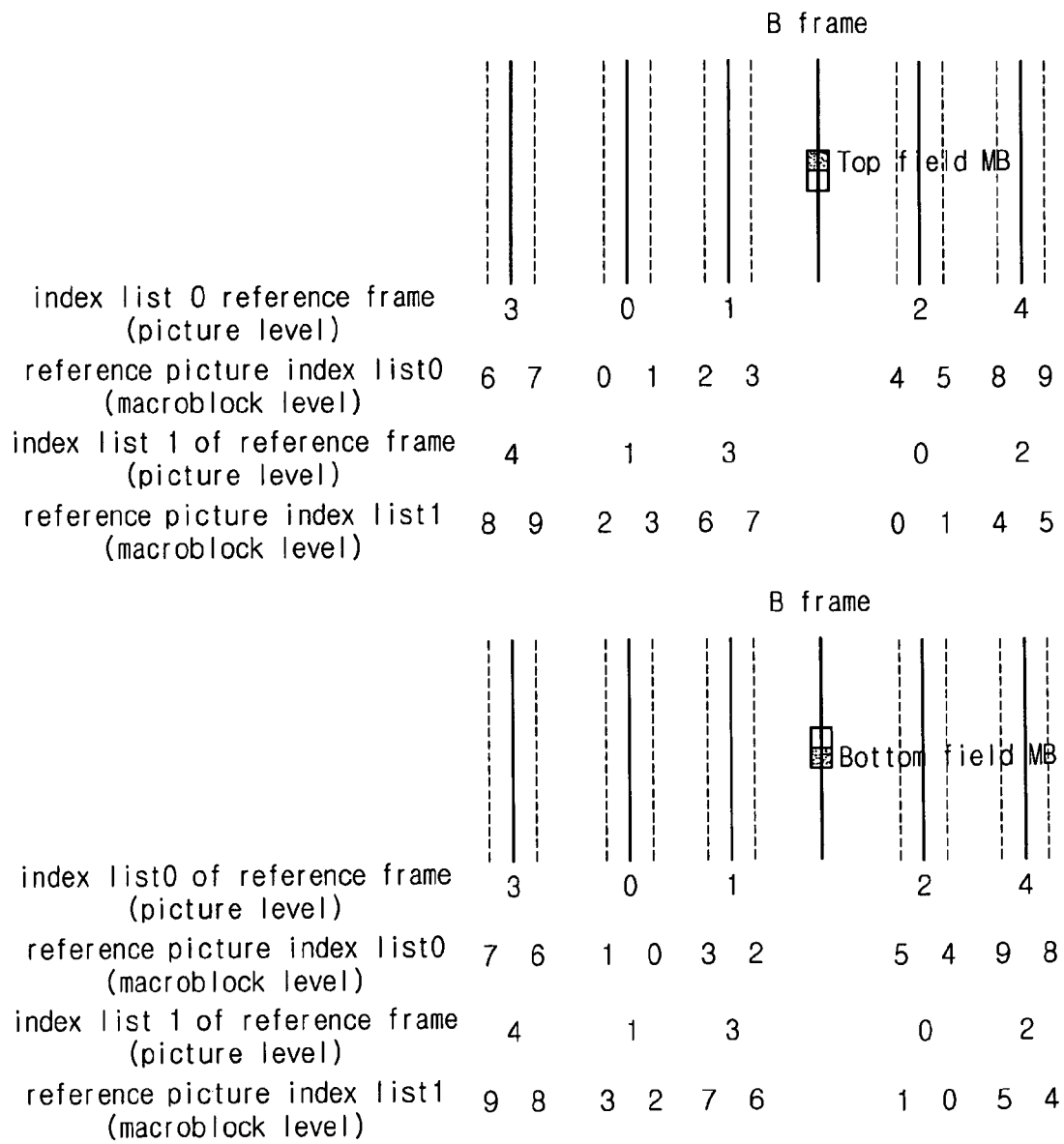
FIG. 11 shows reference picture indexes of a B frame having field macroblocks in a moving picture coding system according to a further embodiment of the present invention (case 3)

Indexes that are increased by one are alternately allocated to reference fields, starting from the reference field having a parity equal to the current field to the reference field having a parity different from the current field, while sequentially visiting the reference frames according to a reference picture index order of the picture (or slice) level. FIGS. 10 and 11 show reference picture indexes for the field macroblocks of a P frame and a B frame.

(Case 4)

Regardless of the top and bottom field macroblocks of a current field macroblock, a lower index is allocated to reference field close to the current field in view of time and a higher index is allocated to reference field farther from the current field in view of time while sequentially visiting the reference frames in an order of the reference picture indexes of the picture (or slice) level.

In other words, the reference field indexes may be given by the equation below.

Reference field index close to the current field=2×picture index of reference frame Reference field index far from the current field=2×picture index of reference frame+1

Figure 12:
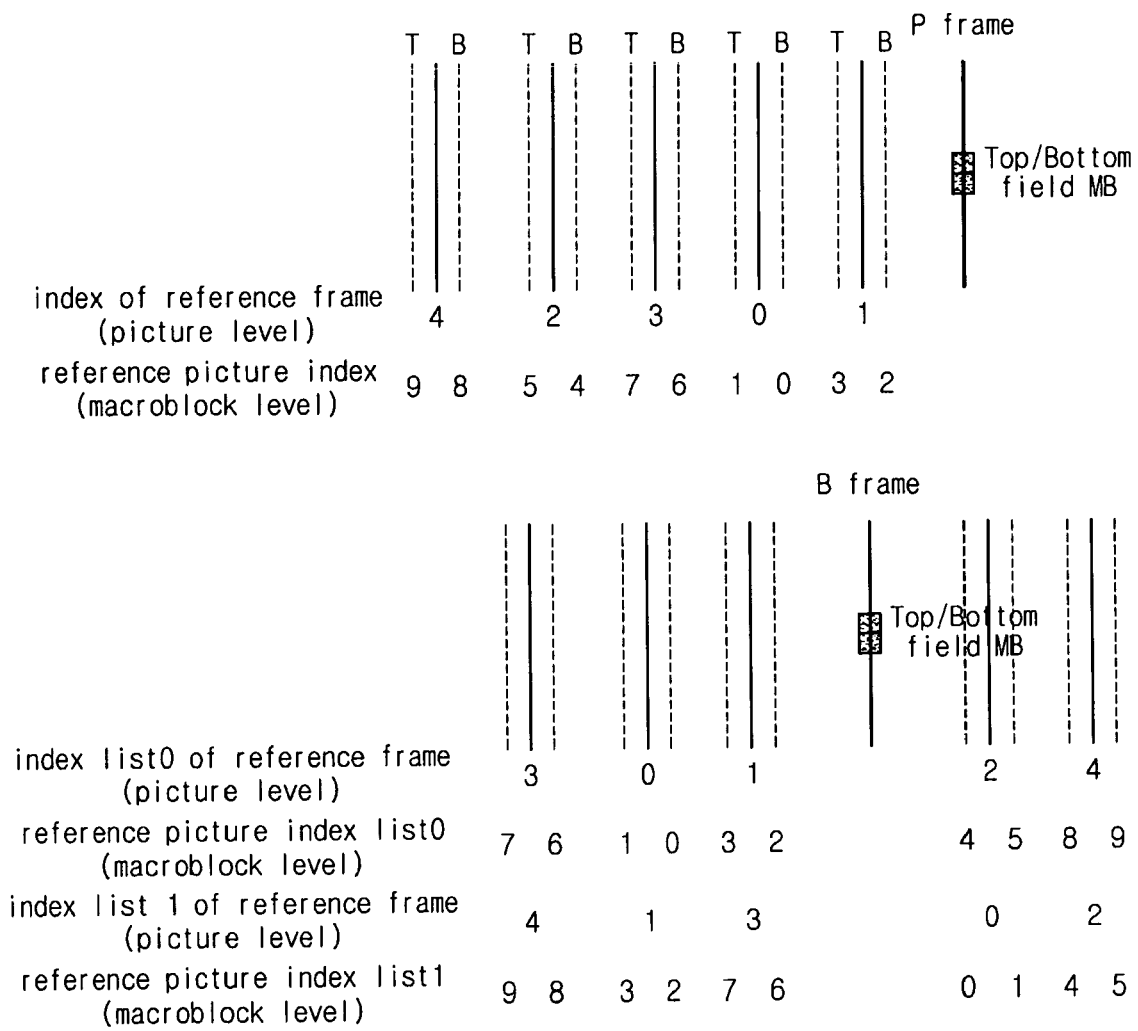
FIG. 12 shows reference picture indexes of a P frame and a B frame having field macroblocks in a moving picture coding system according to another embodiment of the present invention (case 4).

In FIG. 12, there are shown reference picture indexes for a field macroblock of a P frame and a B frame.

While the present invention has been described and illustrated herein with reference to the example embodiments thereof, it will be apparent to those skilled in the art that various modifications and variations can be made therein without departing from the spirit and scope of the invention. Thus, it is intended that the present invention covers the modifications and variations.

According to a coding a moving picture method of at least one embodiment of the present invention, when a moving picture coding system using multiple reference pictures codes an interlaced moving picture into a frame picture having frame/field macroblocks, the moving picture coding system efficiently provides reference picture information used for motion compensation by differently determining reference picture indexes according to coding modes of macroblocks.

The invention claimed is:

1. A method of decoding a current field block by selecting a reference field picture by a decoder, comprising:

obtaining, by the decoder, a reference frame picture list of multiple reference frame pictures information;

determining, by the decoder, a reference frame picture index based on display order information for the multiple reference frame pictures, the reference frame picture index being allocated to reference frames having a less display order than that of a picture including the current field block in reverse order of the display order, and the rest of the reference frame picture index being allocated to reference frames having a greater display order than that of the picture including the current field block;

reordering, by the decoder, a reference frame picture index allocated to each reference frame picture in the reference frame picture list;

obtaining, by the decoder, a reference field picture index representing a reference field picture associated with the current field block;

determining, by the decoder, a reference frame picture from the reference frame picture list based on the reference field picture index divided by 2 and the reordered reference frame picture index;

selecting, by the decoder, a reference field picture having a different parity from the current field block if the obtained reference field picture index is a odd value based on the determined reference frame picture; and decoding, by the decoder, the current field block by referring to the selected reference field picture.

* * * * *